United States Patent [19]

Sugai

[11] Patent Number: 5,564,036

[45] Date of Patent: Oct. 8, 1996

[54] MEMORY PROTECTIVE CIRCUIT

[75] Inventor: Kazuaki Sugai, Yokohama, Japan

[73] Assignee: Canon Kabushiki Kaisha, Tokyo, Japan

[21] Appl. No.: 285,763

[22] Filed: Aug. 3, 1994

Related U.S. Application Data

[63] Continuation of Ser. No. 931,408, Aug. 24, 1992, abandoned, which is a continuation of Ser. No. 625,692, Dec. 12, 1990, abandoned, which is a continuation of Ser. No. 320,794, Mar. 9, 1989, abandoned, which is a continuation of Ser. No. 895,996, Aug. 13, 1986, abandoned.

[30] Foreign Application Priority Data

Aug. 23, 1985 [JP] Japan .................. 60-183918

[51] Int. Cl.⁶ ........................................... G06F 12/14
[52] U.S. Cl. ........................................ 395/479; 395/490
[58] Field of Search ............................ 395/479, 490, 395/491

[56] References Cited

U.S. PATENT DOCUMENTS

| | | | |
|---|---|---|---|
| 3,473,159 | 10/1969 | Cantrell et al. | 364/200 |
| 3,573,855 | 4/1971 | Cragon | 364/200 |
| 3,576,544 | 4/1971 | Cordero, Jr. et al. | 364/200 |
| 4,298,934 | 11/1981 | Fischer | 364/200 |
| 4,332,009 | 5/1982 | Gerson | 364/200 |
| 4,405,983 | 9/1983 | Perez-Mendez | 364/200 |
| 4,545,016 | 10/1985 | Berger | 364/200 |
| 4,589,064 | 5/1986 | Chiba et al. | 364/200 |

*Primary Examiner*—Kevin A. Kriess
*Attorney, Agent, or Firm*—Fitzpatrick, Cella, Harper & Scinto

[57] ABSTRACT

A memory protective circuit comprising a RAM. An area of the RAM where any writing is inhibited is designated. When there are instructions to write into the area where any writing is inhibited, writing into the area is prevented.

12 Claims, 2 Drawing Sheets

MEMORY PROTECTIVE CIRCUIT

This application is a continuation of application Ser. No. 07/931,408 filed Aug. 24, 1992, now abandoned, which is a continuation of application Ser. No. 07/625,692, filed Dec. 12, 1990, abandoned, which is a continuation of application Ser. No. 07/320,794, filed Mar. 9, 1989, abandoned, which is a continuation of application Ser. No. 06/895,996 filed Aug. 13, 1986, abandoned.

BACKGROUND OF THE INVENTION

1. Field of the Invention

The present invention relates to a memory protective circuit which is capable of inhibiting any portion of the memory space from being written.

2. Related Background Art

Conventionally, there are some cases where a vector table of interrupt request signals (IRQ) or a memory control table is expanded on a random access memory (RAM). There are no methods of protecting important data on such table from destruction due to inadvertent, uncontrolled erasure. This is now an issue.

SUMMARY OF THE INVENTION

In view of the above, the present invention provides a memory protective circuit, usable in a personal computer, a word processor or the like, which is capable of inhibiting any area of the memory space from being written, thereby preventing destruction of important data due to inadvertent, uncontrolled erasure.

It is an object of the present invention to prevent the destruction of registers, etc., due to inadvertent, uncontrolled erasure, for example, during software debugging.

It is another object of the present invention to protect an area where key words, such as money information, etc., which are not to be rewritten from outside.

DETAILED DESCRIPTION OF PREFERRED EMBODIMENT

Now the present invention will be described in detail with reference to the drawings.

Figure 1:
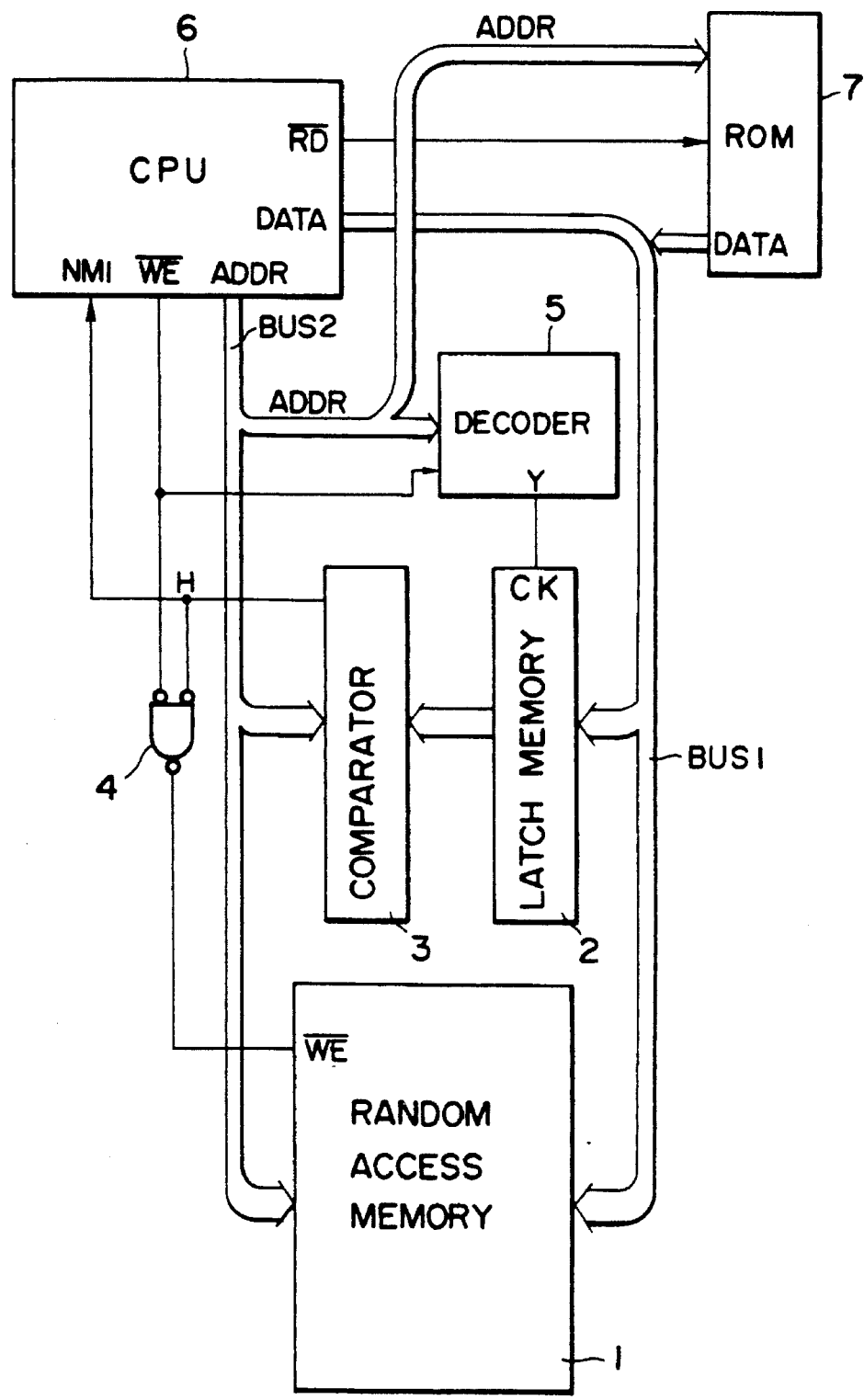
FIG. 1 is a block diagram of one embodiment to which the present invention is applicable.

FIG. 1 shows one example of the structure of the present invention.

In FIG. 1 reference numeral 1 denotes storage means, any area of which is inhibited from being written for protective purposes, as described later. The storage means includes a readable and writable random access memory (RAM).

Figure 2:
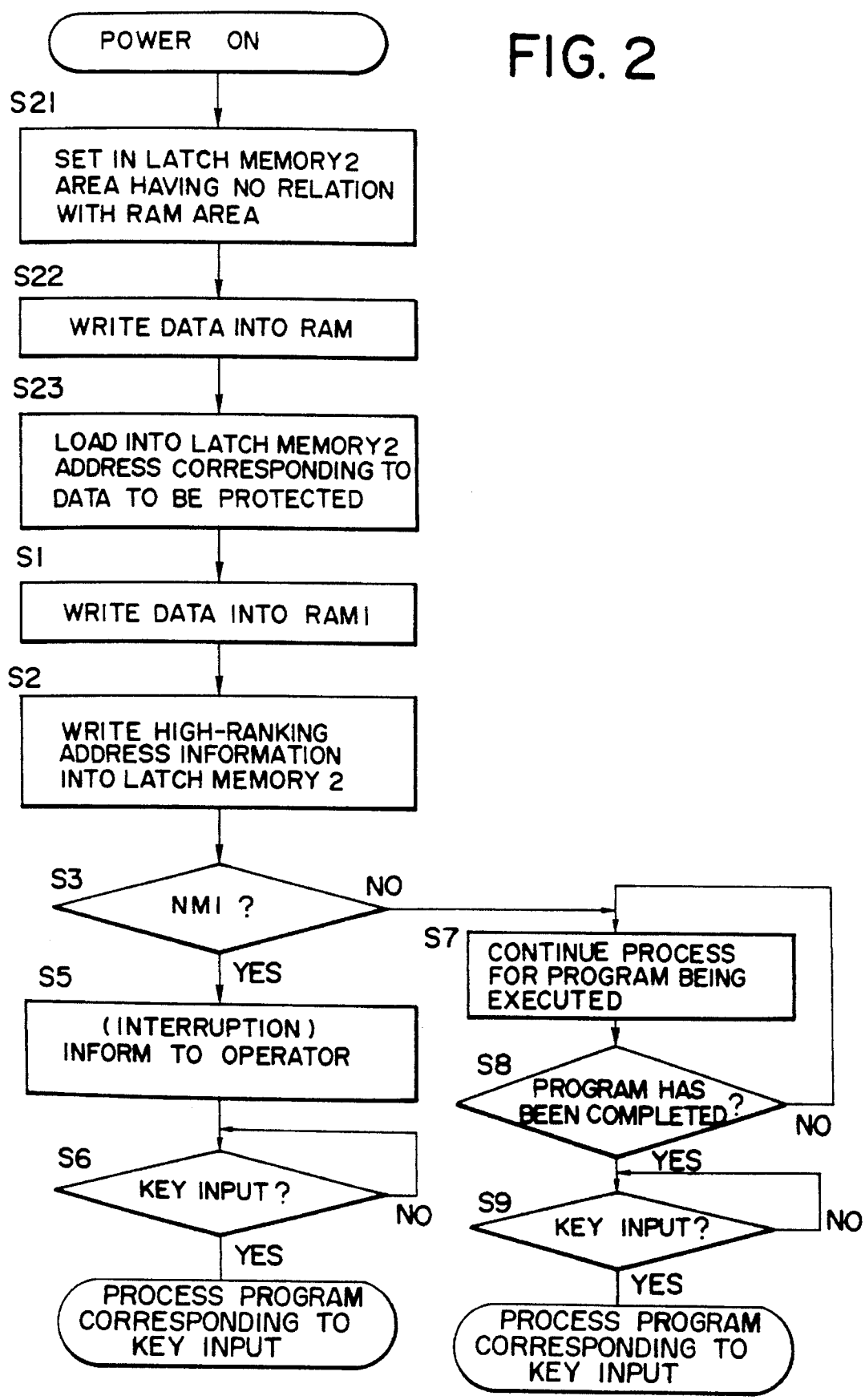
FIG. 2 is a flowchart showing the present invention.

Reference numeral 2 denotes a latch memory into which a protective range of RAM 1 is written by a central processing unit (CPU) 6 via a data bus BUS1. Reference numeral 3 denotes a digital comparator which compares the stored contents of latch memory 2 with address information ADDR on an address bus BUS2. Reference numeral 4 denotes a gate which controls a write signal WE to RAM 1. Reference numeral 5 denotes a decoder which supplies a control signal to the latch memory 2 to allow CPU 6 to write the protective range of RAM 1 into latch memory 2. Reference numeral 7 denotes a read only memory (ROM) in which predetermined programs, for example, referenced in FIG. 2, are stored. In addition to the above elements, CPU 6 is also connected to input-output (I/O) ports to receive and issue control signal inputs, etc.

Comparator 3 is not supplied with all bits of address information ADDR on address bus BUS2. Namely, it is supplied only with significant bits and not with insignificant bits. The total length of the address supplied to BUS 2 is 20 bits, while that to BUS 1 is 16 bits. The memory area which can be protected is 16 bytes if the four least significant bits have not been input into RAM 1 and 32 bytes if the five least significant bits have not been input into RAM 1.

Next, an example of the operation of the present invention will be described with respect to FIG. 2.

First, power is turned on. Then, at step S21, an area, having no relation to the RAM area, is set in latch memory 2 to write data in RAM 1 in step 22, the data to be protected.

At step S22, data, such as key words, which are to be protected are written into RAM 1.

Then, at step S23, the address of a RAM 1 location where the data to be protected is stored is loaded in latch memory 2.

RAM 1 is used as an ordinary RAM for data processing. When RAM 1 is accessed, for example, a high-ranking address is written into latch memory 2 and CPU 6 waits for the result of a determination by comparator 3 which compares the stored contents of latch memory 2 with address information ADDR on the address bus BUS 2. If the determination indicates coincidence, in other words a "YES" at step S3, it implies that writing of data into an area where no data must be written is intended (this is seen by the presence of a nonmaskable interruption (NMI) at step S3). Therefore, control passes to step S5, informing the operator of this. Thus CPU 6 waits for a key input (steps S5 and S6). If no at step S3, i.e., when ordinary processing is being performed, control passes to steps S7 and S8 to continue the processing of a program now in execution. Processing continues ("NO" in step S8) until the program has been completed. A "YES" indicates that the program has finished and the next key input is indicated in step S9 by "YES".

Explanation will now be made as to how to perform a NMI although it involves repeated description of the processing at steps S1 to S3. First, CPU 6 writes predetermined data into RAM 1 via data bus BUS1 (at step S1) and then the high-ranking address information for a space (area) of RAM 1, which is to be protected, into latch memory 2 via data bus BUS1 (step S2). Then comparator 3 compares the high ranking address written into latch memory 2 with predetermined address information on address bus BUS2 when data is written into RAM 1. When the result of comparison at comparator 3 implies coincidence, i.e., when predetermined address information on the protective range of RAM 1 and stored in latch memory 2 appears on the address bus, the output of comparator 3 becomes high "H" which prevents supply of a write signal WE from gate 4 to RAM 1 and which makes a nonmaskable interrupt request NMI to CPU 6 (step S6). This operation implies that writing into any previously set area of RAM 1 is inhibited.

It should be noted that adjustment of the number of address bits input to comparator 3 results in alteration of the protective range of RAM 1. Inputting data and addresses in the particular embodiment may be performed via a keyboard, not shown.

As described above, according to the present invention, the CPU is capable of setting as a write-inhibiting area any space in the RAM used as storage means. This serves to prevent destruction of important data due to inadvertent, uncontrolled erasure.

What I claimed is:

1. An information processing system having a memory protection function comprising:

processing means for processing information;

memory means for storing the information processed by said processing means;

address means for generating first address data to specify an area in said memory means, the first address data including upper address bits and lower address bits;

means for storing second address data for protecting a predetermined area in said memory means, the second address data including address bits corresponding to the upper address bits of the first address data;

first control means for controlling said storing means to store new second address data in response to predetermined address data supplied from said processing means;

comparing means for comparing the upper address bits of the first address data generated by said address means and the second address data stored in said storing means, and for generating a comparison result; and second control means connected to said processing means for applying a signal to said processing means, which indicates that memory access by said processing means is prohibited in accordance with the comparison result generated by said comparing means.

2. A circuit according to claim 1, further comprising means for generating the most significant n bits of the first address data of m bits as resulting address data, where m and n are positive integers and m>n, and for sending said resulting address data to said latch means as said second address data.

3. A system according to claim 1, wherein said processing means comprises a microprocessor.

4. A system according to claim 1, wherein said memory means comprises random access means.

5. A system according to claim 1, wherein said processing means loads the second address into said latch means.

6. An information processing system having a memory protection function comprising:

processing means having an interrupt terminal for processing information by executing a program;

memory means for storing the information processed by said processing means;

address means for generating first address data to specify an area in said memory means, the first address data including upper address bits and lower address bits;

means for storing second address data for protecting a predetermined area in said memory means, the second address data including address bits corresponding to the upper address bits of the first address data, the number of the second address data being smaller than that of the first address data;

control means for controlling said storing means to store new second address data in response to predetermined address data supplied from said processing means;

comparing means for comparing the first address data generated by said address means and the second address data stored in said storing means; and means connected to said interrupt terminal for applying a signal to said interrupt terminal, which indicates that memory access by said processing means is prohibited, in accordance with a comparison performed by said comparing means, thereby enabling said processing means to interrupt the execution of the program.

7. A system according to claim 6, wherein said processing means comprises a microprocessor.

8. A system according to claim 6, wherein said memory means comprises random access means.

9. An information processing system having a memory protection function comprising:

processing means for processing information;

memory means for storing the information processed by said processing means;

address means for generating first address data to specify an area in said memory means, the first address data including upper address bits and lower address bits;

means for storing second address data for protecting a predetermined area in said memory means, the second address data including address bits corresponding to the upper address bits of the first address data, the number of the second address data being smaller than that of the first address data;

first control means for controlling said storing means to store new second address data in response to predetermined address data supplied from said processing means;

comparing means for comparing the first address data generated by said address means and the second address data stored in said storing means; and second control means connected to said processing means for applying a signal to said processing means, which indicates that memory access by said processing means is prohibited in accordance with a comparison made by said comparing means.

10. A system according to claim 9, further comprising means for changing the second address data.

11. A system according to claim 9, wherein said processing mens includes means for interrupting the information processing in response to the signal applied by said control means.

12. An information processing system having a memory protection function comprising:

processing means for processing information;

memory means for storing the information processed by said processing means;

first address means for generating first address data to specify an area in said memory means, the first address data including upper address bits and lower address bits;

second address means for storing second address data for protecting a predetermined area in said memory means, changing means, responsive to address data from said processing means, for modifying the second address data to change the protected predetermined area in said memory means;

comparing means for comparing the upper address bits of the first address data generated by said first address means and the second address data stored in said second address means; and control means connected to said processing means for applying a signal to said processing means, which indicates that memory access by said processing means is prohibited in accordance with a comparison made by said comparing means.

* * * * *

UNITED STATES PATENT AND TRADEMARK OFFICE
CERTIFICATE OF CORRECTION

PATENT NO.  : 5,564,036

DATED       : October 8, 1996

INVENTOR    : KAZUAKI SUGAI

It is certified that error appears in the above-identified patent and that said Letters Patent is hereby corrected as shown below:

COLUMN 3

```
Line 3,   "claimed" should read --claim--;
Line 29,  "circuit" should read --system--;
Line 33,  "latch" should read --storing--;
Line 40,  "latch" should read --storing--.
```

COLUMN 4

```
Line 37,  "mens" should read --means--.
```

Signed and Sealed this

Fourteenth Day of October, 1997

Attest:

BRUCE LEHMAN

*Attesting Officer*   *Commissioner of Patents and Trademarks*